J. STARK.
Watchmakers' Lathe-Chucks.

No. 141,824. Patented August 12, 1873.

Witnesses.
S. U. Piper
L. N. Holler

John Stark
by his attorney
R. H. Eddy

UNITED STATES PATENT OFFICE.

JOHN STARK, OF WALTHAM, MASSACHUSETTS.

IMPROVEMENT IN WATCH-MAKERS' LATHE-CHUCKS.

Specification forming part of Letters Patent No. 141,824, dated August 12, 1873; application filed June 25, 1873.

*To all whom it may concern:*

Be it known that I, JOHN STARK, of Waltham, of the county of Middlesex and State of Massachusetts, have invented a new and useful Adjustable Centering-Chuck for use upon a Watch-Maker's Lathe; and I do hereby declare the same to be fully described in the following specification and represented in the accompanying drawings, of which—

Figure 1:
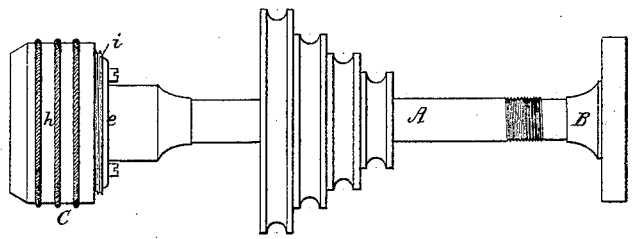
Figure 2:
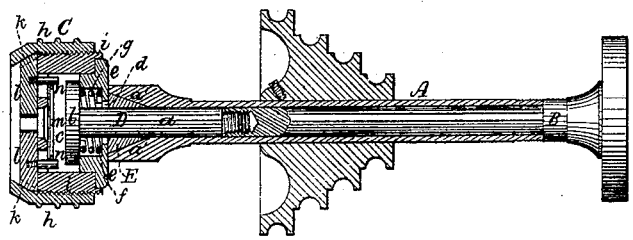
Figure 3:
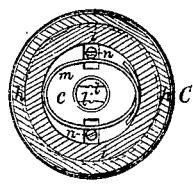
Figure 4:
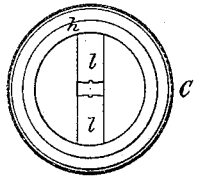

Figure 1 is a side elevation, and Fig. 2 a longitudinal section, of such chuck and a lathe-arbor of full size. Fig. 3 is a transverse section of the chuck. Fig. 4 is a front-end view of it.

This chuck is intended for use with the well-known watch-maker's lathe described in Letters Patent of the United States numbered 21,864, dated October 19, 1858, and granted to George W. Daniels, the elastic, tubular, conical, and jawed clamp being first removed from the tubular arbor before applying the chuck thereto.

In the drawings, A denotes the lathe-arbor, and B the tubular back screw thereof, such arbor having a conical chamber, $a'$, in its front end. To connect the chuck C with the arbor I employ a screw, D, whose shank $a$ is cylindrical, and adapted to screw into the tubular back screw, there being a circular and broad head, $b$, to the screw D. Furthermore, there is arranged upon the shank of the screw D a conic frustum, E, which turns and slides freely thereon, and serves to fill the conical chamber $a'$ in the lathe-arbor and increase the friction-surface to hold the chuck. The head of the screw D is within the cylindrical chamber $c$ of the chuck, the shank $a$ going through a cylindrical hole, $d$, in the cap $e$ of the chuck-chamber. This hole has a diameter larger than that of the said shank, and there is upon the shank, and between the head and the cover or cap $e$, a helical spring, $f$, to bear against the two, so as to press the cover against the next adjacent end of the arbor and the base of the frustum. The spring is extended into a socket, $g$, in the cap, having a diameter less than that of the head $b$, in order that the head may operate to clamp the cap against the end of the arbor. The chuck C is composed of two circular boxes, $h\ i$, one being screwed into the other concentrically. The outer one is open at its front end, and has a portion, $k$, of its inner periphery conical or tapering, as shown, to act against two slides or jaws, $l\ l$, arranged diametrically in the end of the inner box $i$. These jaws are dovetailed in cross-section to fit and slide in corresponding grooves, and by screwing up the part $h$ such jaws will be forced toward each other. A spring, $m$, arranged within the inner box and against projections $n\ n$ from the said jaws $l\ l$, serves to move the jaws in opposite directions while the outer box is in the act of being unscrewed. The cap $e$ of the inner box is fastened thereto by screws.

From the above it will be seen that an article introduced between the jaws may be clamped by them to the chuck, after which the article may be centralized or have its axis arranged in the prolongation of that of the arbor by simply moving the chuck laterally, as occasion may require, while the arbor may be in the act of being revolved, the spring $f$ serving to retain the chuck in place after each movement of it, and until the back screw can be screwed up so as to effect the clamping of the chuck of the arbor.

I claim—

1. The clamp-screw D, arranged and combined with the chuck C, having its cap $e$ provided with the hole $d$, larger in diameter than the screw-shank, all being for use with the watch-lathe arbor and its back screw, as explained.

2. The friction-spring $f$ and clamp-screw D, arranged and combined with the chuck C, as specified, and for use with the latter and the lathe-arbor and back screw, as set forth.

3. The conic frustum E, separate from the chuck clamp-screw D, combined therewith and with the lathe-arbor, substantially as described.

JOHN STARK.

Witnesses:
   R. H. EDDY,
   J. R. SNOW.